United States Patent
Bharadwaj et al.

(10) Patent No.: US 11,349,783 B2
(45) Date of Patent: May 31, 2022

(54) HOST INPUT/OUTPUT BASED LOAD BALANCING ON FIBRE CHANNEL N_PORT VIRTUALIZER SWITCH UPLINKS

(71) Applicant: Cisco Technology, Inc., San Jose, CA (US)

(72) Inventors: Harsha Bharadwaj, Bangalore (IN); Santhosh Hanumana Gowda, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 143 days.

(21) Appl. No.: 16/531,324

(22) Filed: Aug. 5, 2019

(65) Prior Publication Data
US 2021/0044543 A1 Feb. 11, 2021

(51) Int. Cl.
  *H04L 49/356* (2022.01)
  *H04L 67/1001* (2022.01)
  *G06F 13/40* (2006.01)
  *H04L 43/16* (2022.01)
  *H04L 67/1097* (2022.01)

(52) U.S. Cl.
  CPC ........ *H04L 49/357* (2013.01); *G06F 13/4022* (2013.01); *H04L 43/16* (2013.01); *H04L 67/1002* (2013.01); *H04L 67/1097* (2013.01)

(58) Field of Classification Search
  CPC ... H04L 49/357; H04L 43/16; H04L 67/1002; H04L 67/1097; G06F 13/4022
  See application file for complete search history.

(56) References Cited

U.S. PATENT DOCUMENTS

| 5,432,824 | A | * | 7/1995 | Zheng | H04L 12/5602 370/232 |
| 6,810,356 | B1 | * | 10/2004 | Garcia-Franco | H04L 41/142 379/133 |
| 2002/0156887 | A1 | * | 10/2002 | Hashimoto | H04L 29/06 709/224 |
| 2003/0202511 | A1 | * | 10/2003 | Sreejith | H04L 49/50 370/389 |
| 2005/0108444 | A1 | * | 5/2005 | Flauaus | H04L 47/11 710/15 |

(Continued)

OTHER PUBLICATIONS

Brocade Communications Systems LLC, "Brocade Fabric OS Access Gateway Administration Guide, 8.2.0", Supporting Fabric OS 8.2.0 and 8.2.0a, 53-1005258-03, Apr. 10, 2018 (Year: 2018).*

(Continued)

*Primary Examiner* — Joseph A Bednash
(74) *Attorney, Agent, or Firm* — Edell, Shapiro & Finnan, LLC

(57) ABSTRACT

A method includes measuring input/output traffic for respective hosts that are connected to a Fibre Channel N_Port Virtualizer (FC-NPV) switch, which is in communication with a first N_Port ID Virtualization (NPIV) core switch via a first port channel and with a second NPIV core switch via a second port channel; determining that traffic carried on the first port channel between the FC-NPV switch and the first NPIV Core switch exceeds a predetermined threshold compared to traffic carried on the second port channel; and re-assigning traffic from a given host carried on the first port channel to the second port channel between the FC-NPV switch and the second NPIV core switch.

20 Claims, 5 Drawing Sheets

(56) References Cited

U.S. PATENT DOCUMENTS

| | | | | |
|---|---|---|---|---|
| 2009/0190558 A1* | 7/2009 | Strutt | .................... | H04L 1/0019 |
| | | | | 370/332 |
| 2011/0228670 A1* | 9/2011 | Sasso | ...................... | H04L 45/02 |
| | | | | 370/221 |
| 2012/0226801 A1* | 9/2012 | Velaga | ................ | H04L 67/1097 |
| | | | | 709/224 |

OTHER PUBLICATIONS

Cisco, "Configuring N Port Virtualization", Cisco MDS 9000 Family NX-OS Interfaces Configuration Guide, downloaded Aug. 5, 2019, 1. www.cisco.com/c/en/us/td/docs/switches/datacenter/mds9000/sw/5_0/configuration/guides/int/nxos/cli_interfaces/npv.pdf, 14 pages.

Brocade Communications Systems LLC, "Brocade Fabric OS Access Gateway Administration Guide, 8.2.0", Supporting Fabric OS 8.2.0 and 8.2.0a, 53-1005258-03, Apr. 10, 2018, https://docs.broadcom.com/docs-and-downloads/bsn/53-1005258-03_fos-820-accessgateway.pdf, 96 pages.

Cisco, "Cisco Nexus 9000 Series NX-OS FC NPV Configuration Guide, Release 9.3(x)", Jul. 20, 2019, https://www.cisco.com/c/en/us/td/docs/switches/datacenter/nexus9000/sw/93x/fc-npv/configuialion/guide/b-cisco-nexus-9000-nx-os-fcnpv-configuration-guide-93x/b-cisco-nexus-9000-nx-os-fcnpv-configuration-guide-93x_chapter_010.html, 40 pages.

Pangalos, Blaise, "Advanced Storage Area Network Design", BRKSAN-2304, downloaded Aug. 5, 2019, http://docshare02.docshare.tips/files/19429/194297217.pdf, 78 pages.

Cisco, "Nexus 2000 Fabric Extenders Supported/Unsupported Topologies", Updated: Apr. 10, 2019, Document ID: 200363, 16 pages.

\* cited by examiner

HOST INPUT/OUTPUT BASED LOAD BALANCING ON FIBRE CHANNEL N_PORT VIRTUALIZER SWITCH UPLINKS

TECHNICAL FIELD

The present disclosure relates to load balancing port channels between a Fibre Channel N-port virtualizer (FC-NPV) switch and N-port ID virtualized (NPIV) core switches.

BACKGROUND

Fibre Channel (FC) is a high-speed data transfer protocol that provides lossless delivery of raw block data, and is primarily employed to connect computer data storage to servers. More specifically, Fibre Channel is often used to implement a storage area network (SAN) in a data center. Fibre Channel typically runs on optical fiber cables within and between data centers, but can also run on copper cabling.

In a typical implementation, end devices are connected to FC switches. To scale switching fabrics in a FC network, virtualization may be implemented. In one possible configuration, multiple hosts may be connected to a FC N-Port virtualization (FC-NPV) switch, which may, in turn, be connected to one or more N_Port ID virtualization (NPIV) switches, thus enabling multiple virtual servers to share a single physical Fibre Channel port identification (ID) (FC_ID).

DESCRIPTION OF EXAMPLE EMBODIMENTS

Overview

In one embodiment, a method is provided including measuring input/output traffic for respective hosts that are connected to a Fibre Channel N_Port Virtualizer (FC-NPV) switch, which is in communication with a first N_Port ID Virtualization (NPIV) core switch via a first port channel and with a second NPIV core switch via a second port channel; determining that traffic carried on the first port channel between the FC-NPV switch and the first NPIV Core switch exceeds a predetermined threshold compared to traffic carried on the second port channel; and re-assigning traffic from a given host carried on the first port channel to the second port channel between the FC-NPV switch and the second NPIV core switch.

In another embodiment, an apparatus is provided. The apparatus includes an interface unit configured to enable network communications; a memory; and one or more processors coupled to the interface unit and the memory, and configured to: measure input/output traffic for respective hosts, which are in communication with a first N_Port ID Virtualization (NPIV) core switch via a first port channel and with a second NPIV core switch via a second port channel; determine that traffic carried on the first port channel exceeds a predetermined threshold compared to traffic carried on the second port channel; and re-assign traffic from a given host carried on the first port channel to the second port channel.

EXAMPLE EMBODIMENTS

Figure 1:
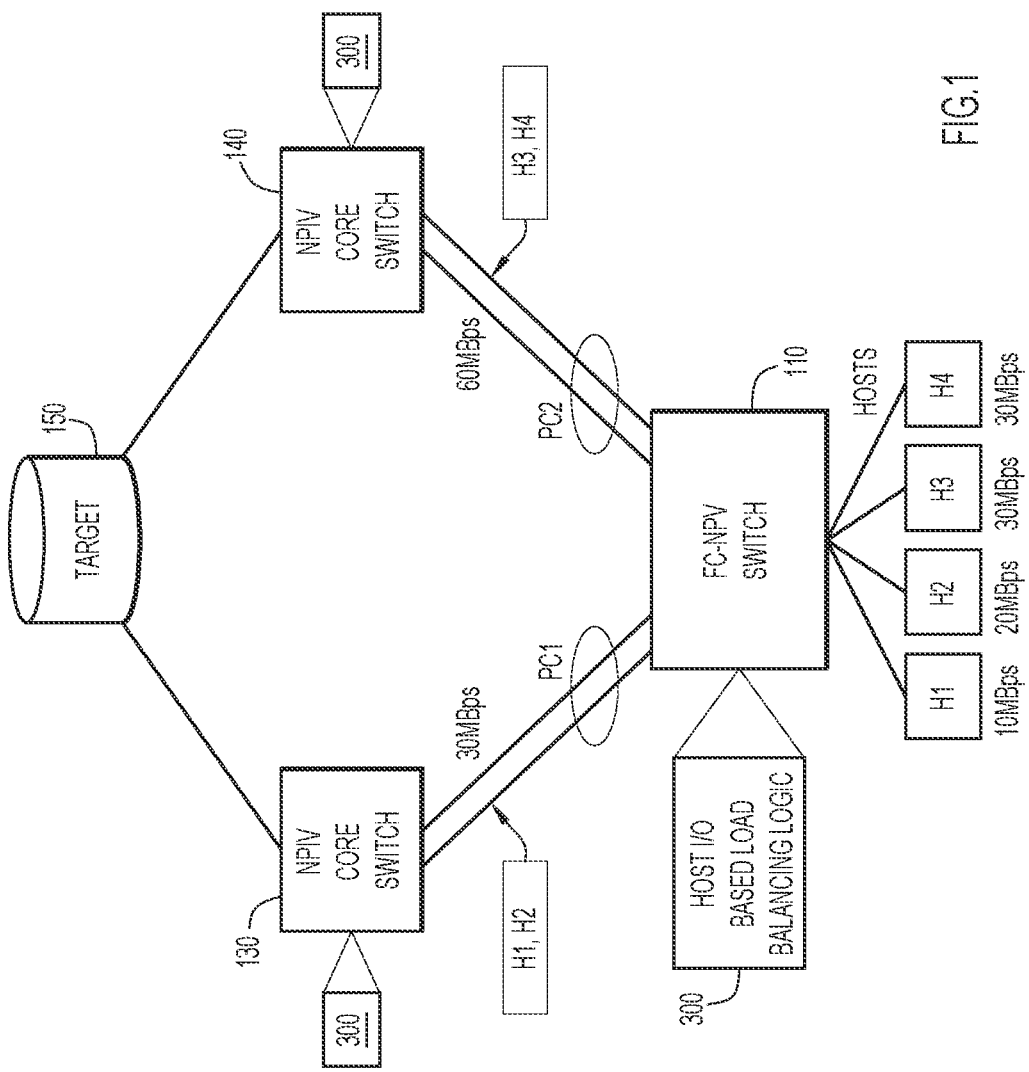
FIG. 1 shows a Fibre Channel network topology, including a switch having host I/O based load balancing logic, in which port channel traffic is not balanced, in accordance with an example embodiment.

FIG. 1 shows a Fibre Channel network topology, including a switch having host I/O based load balancing logic, in which port channel traffic is not balanced, in accordance with an example embodiment. Specifically, host H1, host H2, host H3, and host H4 are each connected to FC-NPV switch 110, which includes host input/output (I/O) based load balancing logic (or "logic") 300, the function of which is described in detail below. FC-NPV switch 110 is connected to NPIV Core switch 130 via a first port channel PC comprising at least one primary and one secondary link, and FC-NPV switch 110 is also connected to NPIV Core switch 140 via a second port channel PC2 also comprising at least one primary and one secondary link. NPIV Core switches 130, 140 are each connected to a target 150. As shown, and in certain embodiments, NPIV core switches 130, 140 may also host logic 300.

The NPV (N_port Virtualizer) feature in a Fibre Channel network enables FC fabric scaling without exhausting the limited domain-id space of, in one possible implementation, 239 domains per fabric. FC-NPV switch 110 does not consume a domain-id and acts as an extender of the FC fabric connecting end devices (typically hosts/servers) to the NPIV core switches 130, 140. All control and data plane functionality is available only in the core NPIV switch and so all traffic from end devices is forwarded to the core NPIV switches. The core NPIV switches treat the NPV switch connections like FC F_ports and processes host logins and setup of forwarding tables accordingly. As shown FC-NPV switch 110 is typically connected to dual core (NPIV) switches for redundancy. Since a given host performs FC login (FLOGI) to a fabric to obtain a FCID before it can start sending traffic, the FLOGI from the device (host) is forwarded on one of the uplinks (PC1 or PC2) to one the NPIV core switches 130, 140. One of the NPIV core switches 130, 140 assigns to the requesting host an FC_ID using its own domain-id as though the login request came through an Fport. All transmit (Tx) and receive (Rx) traffic from the given host is forwarded on the same uplink (individual port or a port-channel, i.e., PC1 or PC2), else traffic will be dropped due to an invalid source ID/destination ID (SID/DID) detected in the NPIV core switch 130 or 140. By default, an auto-load balancing scheme on the FC-NPV switch 110 tries to map the host FLOGIs in equal proportion to the available uplinks at that point, thereby binding each given host of FC-NPV switch 100 to a specific uplink (PC1 or PC2, and thus corresponding NPIV core switch 130, 140) as long as that host login is active. It generally does not matter to which NPIV core switch 130 or 140 a given host login is bound since both the NPIV core switches 130, 140 are connected to the same fabric upstream and will have equal cost paths to the storage devices they communicate with.

To take care of topology changes with regard to uplink connectivity, a command line interface (CLI) command npv loadbalance disruptive redistributes existing host logins evenly at that instant by forcing a re-login if necessary. One of the drawbacks of this system driven load balancing is that there is no certainty to which uplink a given host would be mapped to. This means there is no determinism with regard to uplink bandwidth availability for a given host. To overcome this uncertainty to a certain extent, there is an option to pin certain host F_ports to one primary and multiple secondary uplinks using a npv traffic-map CLI command. If the primary PC were to fail, a failover is triggered to the secondary PC. After recovering a failed PC, a manual flap would cause a fail back. FC-NPV switch 110 with trunk PC connectivity to dual NPIV cores switches 130, 140 where npv loadbalance OR a npv traffic-map distributes logins uniformly to the PCs is the recommended configuration. This ensures the NPIV core switches 130, 140 treat their ends of the uplink as one logical trunk F_port PC and all traffic is load balanced fairly evenly among all the members of the PC in either direction and among all virtual SANs (VSANs) of the trunk using the hash of FC header fields (SID, DID, originator exchange identifier (OXID)).

It is noted that FC-NPV switch 110 is unlike the fabric extender (FEX) solution in Ethernet. Ethernet has no notion of a device logging in to the fabric before initiating traffic. The absence of login means any of the available uplinks can be chosen for forwarding of traffic to the core switch (when explicit pinning is not done). An Active-Active (A-A) FEX using vPCs is the ideal solution for optimal utilization of the uplink bandwidth for the hosts. A vPC type connectivity, however, is not possible today with FC switches due to implicit binding of a host to a single fabric switch to which it is logged in.

SAN Analytics provides switch based I/O metrics measurements for every flow (referenced by the Initiator/Target/LUN (logical unit number) tuple, or "ITL"). The SAN analytics uses a network processing unit (NPU) connected to the FC-NPV switch 110 to compute several I/O metrics on a per-(port, ITL) basis. It is also possible to view these metrics either on a per-ITL basis (finest-granularity) or per-Initiator basis (intermediate granularity), or a per-Port basis (coarse granularity) using the concept of views.

Port Monitor (PMON) is a hardware based network operating system (NX-OS) feature that is built into switches. It can monitor physical port related critical counters in real time and alert external monitoring software of any anomalies as defined by configuration. The PMON configuration involves an upper/lower threshold of a counter to be monitored, the monitoring interval and the action to be taken when threshold values are breached.

It has been observed that even with fairly distributing FLOGIs among the PCs and the PC hashing load balancing traffic across members of the PC, there can be a significant traffic imbalance among the two PC uplinks (PC1, PC2) between FC-NPV switch 110 and the NPIV core switches 130, 140. This is because the individual host traffic patterns vary significantly from each other. It is possible, for example, that all the hosts generating intense I/O are mapped to one PC uplink and the other PC uplink is lightly loaded. In such scenarios, the SAN network design done carefully with certain host to fabric bandwidth oversubscription ratio might show a significant skew with regard to link utilization. For example, a host to fabric oversubscription ratio designed as 1:10, could be operating at a high 1:20 on PC1 and as low as 1:2 on PC2. FIG. 1 shows FLOGI balance, with 2 FLOGIs per port channel, but a 2-to-1 or 100% traffic imbalance. This imbalance in traffic means:

Non-optimal utilization of the available fabric bandwidth, with the risk of saturation only on certain links and switches;

Performance impact (high I/O latency) on the servers mapped the overloaded PC; and High usage of only on one leg of the connectivity means propagation of slow drain symptoms to farther reaches of the no-drop FC fabric.

Those skilled might try to implement a simple manual solution using existing mechanisms to solve the unbalance problem by first detecting the uplink traffic imbalance by one of the below two methods:

1. Direct: Directly measure and monitor traffic imbalance on each of the uplink PC interfaces; and/or 2. Indirect: Measure traffic load on each host edge port. With the current (host→uplink) traffic map, indirectly measure uplink interface traffic imbalance.

While the direct approach may seem simpler, it will not work in a multi-VSAN environment since the FC-NPV switch 110 (i.e., the application specific integrated circuits (ASICs) operating therein) lack the capability to measure traffic per-VSAN on an interface. Ideally, it is not best practice to have all hosts of a VSAN mapped to a single uplink such that there might be a complete VSAN blackout during a PC failover.

An indirect measurement is preferable to deduce an ideal traffic-map that pins every host to a primary/secondary uplink PC based on the measured host traffic in a VSAN aware manner. In the example above, if four hosts, as shown in FIG. 1, were ordered according to their traffic rates a npv traffic-map can be configured as:

host H1, host H3→PC1<primary>, PC2<secondary>.
host H2, host H4→PC2<primary>, PC1<secondary>

However there several issues with this approach:

The I/O from hosts in a data center can vary over a period of time and manually measuring this (on potentially hundreds of hosts in large fabric) is not practical. Often times, only the last 5 minute average traffic rate per port is maintained by the switch.

The traffic rate measured on the NPV host edge port is not indicative of the I/O rate. Since the I/O request originates from the applications running on the hosts, only the I/O traffic can be indicative of the sustained contribution of a given hosts data traffic rate. All the non-O activity on a server (like SCSI discovery/keepalives, etc., FC Aborts/RSCN storms, etc.) should ideally be ignored since they are transient in nature. If only I/O had to be measured, it would require external ways of measuring I/O (e.g. iostat command on linux hosts) usually involving crossing the administrative boundary of the storage admin.

Even if using overall traffic rate on host edge ports as representative of host I/O would be acceptable, it would also require constant manual monitoring of every host edge port and knowledge of traffic map for each NPV switch (per-VSAN) which is a significant book keeping effort and hence not practical.

The embodiments described herein provide a comprehensive solution that achieves automatic and dynamic load balancing to map hosts to uplinks based on the long term observed host I/O activity, rather than just limiting to uniform distribution of the FLOGIs. The embodiments operate in a VSAN aware manner with minimal admin intervention and disruption to current state of the fabric. The overall approach includes two parts: (a) measuring long term I/O per host, and (b) defining a new PMON policy. These functionalities may be performed by host I/O based load balancing logic 300.

(a) Measure Long Term I/O Per Host

In an embodiment, SAN Analytics capabilities are used to measure the I/O throughput on the NPV uplink ports (PC1, PC2) and the edge ports of hosts H1, H2, H3, and H4. In one implementation, SAN Analytics requires greater than or equal to 32G FC capable switches and, as such, several options are possible depending on the FC-NPV switch 110 and NPIV core switches 130, 140 in the fabric:

1. 32G FC-NPV 110 and any NPIV core switch 130, 140: in this configuration, logic 300, using SAN Analytics, is enabled on the FC-NPV host edge and uplink ports and reads the total_read_io_bytes, total_write_io_bytes, sampling_start_time and sampling_end_time_metrics. With these metrics from the VSAN view, logic 300 can measure Avg I/O throughput per-VSAN on each uplink. On the host edge port Initiator view, logic 300 computes the Avg I/O throughput (ingress & egress) on a per-host basis.

2. 16G FC-NPV 110 and 32G NPIV core switches 130, 140: the above-noted SAN Analytics measurement of I/O throughput is performed on the NPIV core switch uplink F-port PC members. In this configuration, the SAN Analytics can measure both the per-host I/O throughput and also the per-(port, VSAN) I/O throughput for the uplink F-ports from the NPIV core switch 130, 140 end. Once this computation is complete, results can be periodically distributed to the 16G FC-NPV switch 110 using either an in-band or an out-of-band scheme.

3. 16G FC-NPV and 16G NPIV core switches: in order to not exclude this scenario, logic 300 may use the existing tx_datarate and rx_datarate interface counter aggregation on the edge ports and uplinks to measure the average load on the links. However these counters can only be considered an approximation of the I/O throughput. Further the load per VSAN on the uplinks is measured indirectly by computing the traffic throughput on each host and using the current mapping of host to uplinks.

In general, an average throughput measured should be acceptable as the value to be used for traffic estimation on a network link. While this assumption can be used for purpose of computing the imbalance on the PC uplink (PC1, PC2), the same logic cannot be extended to host ports since hosts in a data center are notoriously bursty. To account for the "bursty-ness," a general rule-of-thumb bandwidth provisioning formula use a safety margin of +30% above the average measured rate. Instead of relying on such random estimates, logic 300 computes a long term mean and standard deviation of the I/O throughput per-host to account for the bursty-ness. This ensures that unnecessary overestimation is not performed, and bandwidth resources are optimally utilized while also providing sufficient cushion for the occasional traffic bursts.

Logic 300 may estimate long-term host I/O throughput (T) using the formula T=m+s, where:

m=long term sample mean I/O throughput in terms of B/s, i.e.

$$m = \frac{1}{n}\sum_{i=1}^{n} x_i$$

where x represents the Avg Throughput measured in one time interval. The long term by default is a period of 24 hours, measured every 30 second time interval, i.e. n=24 h*60 m*2.

s=One sample Standard Deviation (SD) of the I/O throughput from the mean, i.e., $$s = \sqrt{\frac{1}{N-1}\sum_{i=1}^{N}(x_i - \bar{x})^2}$$

where $(x_i - \bar{x})$ represents a difference of the measured throughput from the sample mean and N=24 h*60 m*2.

Using one SD ensures that about 70% of the time the bandwidth is sufficient assuming a Gaussian traffic distribution pattern. The one SD worth of safety margin is deemed sufficient since not all servers are expected to burst at the same instant.

Logic 300 can determine both the sample mean and standard deviation on, e.g., FC-NPV switch 110 itself using, e.g., a python script for a 24 hour monitoring period with a 30 second measurement for each port. It is recommended to measure at least a 24 hr window since some of the hosts (which could be, e.g., backup servers) will peak only during certain times of the day. Logic 300 may present a user interface for:

StartNPVTrafficAnalysis: Initiate measurement of long term I/O throughput for host ports;

StopNPVTrafficAnalysis: Stop measurement of long term I/O throughput for host ports;

ShowNPVTrafficMap: Compute the best possible distribution of hosts to uplinks based on the long term I/O throughput in a VSAN aware manner.

Logic 300 deduces the traffic map with the principle of fairly equal load distribution in a least disruptive manner to the current mapping of hosts to PC uplinks in a VSAN aware manner. In rare situations when a single host is doing significantly higher I/O than all other hosts combined, no fair distribution may be possible. In such cases, an appropriate error may be shown via the user interface. Since it really does not matter which of the core NPIV a given host I/O lands on, logic 300 may assume there is no uplink affinity for a given host.

Additional options can be provided to override the default 24 hour monitoring and the 30 sec measuring period. Logic 300 may also monitor port down events to stop/reset calculations during that period.

(b) Define a New PMON Policy

Logic 300 defines a PMON policy based on a tolerance range for the uplink traffic imbalance and an action to be taken to rectify the imbalance. The tolerance value for the uplink imbalance in terms of rising and falling thresholds may be user configurable. Once tolerance is breached, PMON can invoke the ShowNPVTrafficMap to retrieve the system computed traffic-map. Logic 300 can implement actions, which can be defined as either automatic or manual application of the traffic-map. A manual option would involve sending an alert (SNMP Trap/Syslog) to an administrator indicating a new traffic map that needs to be applied. An automatic option involves applying the traffic-map without involving the administrator.

Once a PMON policy is configured, logic 300 can (continuously) monitor the traffic load on the uplinks and take the appropriate action without administrator intervention.

A default PMON policy may be active with a tolerance value for the uplink imbalance as 40% and action of sending a Syslog/SNMPTrap indicating a NPV switch with uplink traffic imbalance. The administrator may then execute ShowNPVTrafficMap to view the new system computed traffic map and apply it to fix the imbalance.

Figure 2:
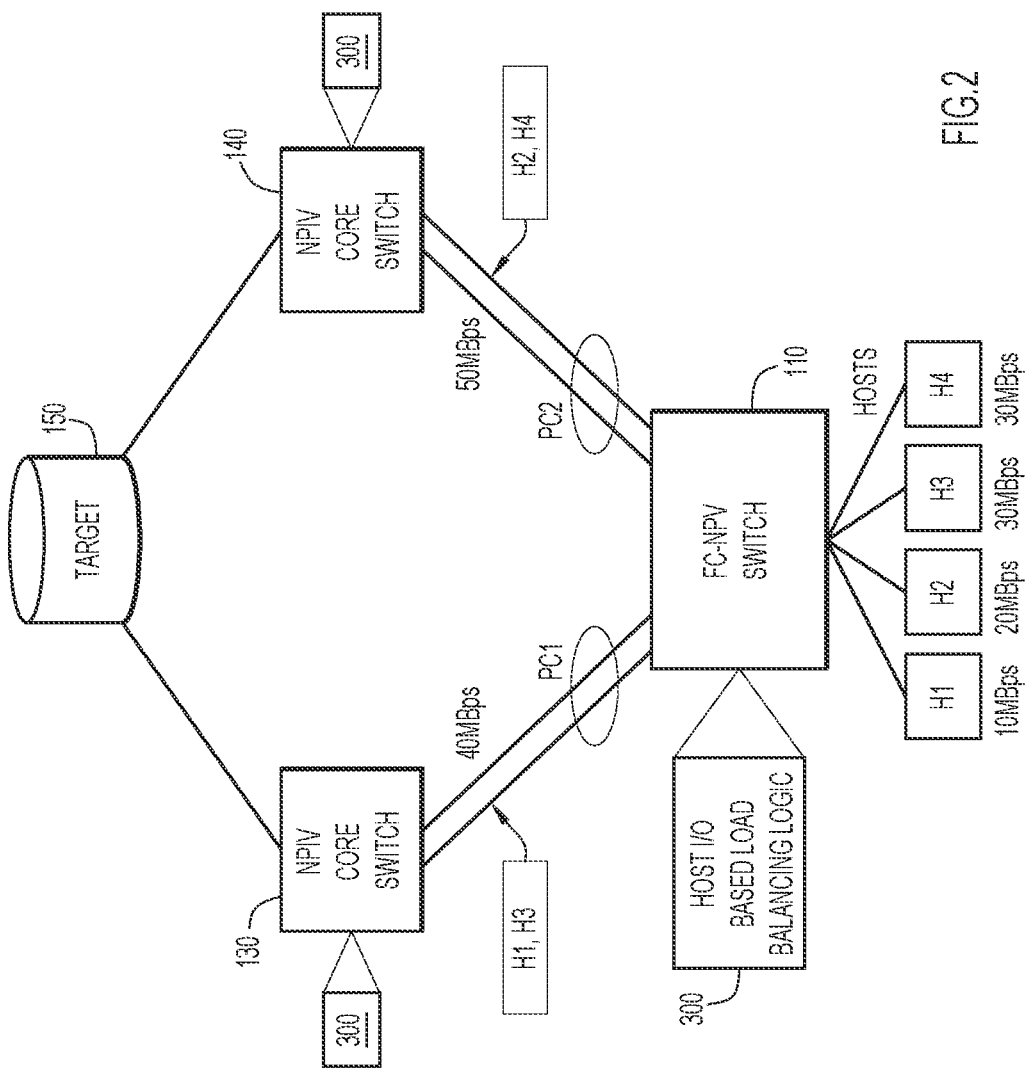
FIG. 2 shows a Fibre Channel network topology, including a switch having host I/O based load balancing logic, in which port channel traffic is balanced, in accordance with an example embodiment.

The traffic map suggestion for the above illustrated example would result in the topology shown in FIG. 2. That is logic 300 would analyze the traffic shown in FIG. 1, and redistribute the traffic as shown in FIG. 2, where port channel PC1 handles traffic from hosts H1 and H3, and port channel PC2 handles traffic from hosts H2 and H4. In the case of the redistribution, or load balancing, of traffic in FIG. 2, there are 2 FLOGIs on each port channel, and there is a total of 40 MBps on PC1, and 50 MBps on PC2, resulting in an imbalance of 20%.

Figure 3:
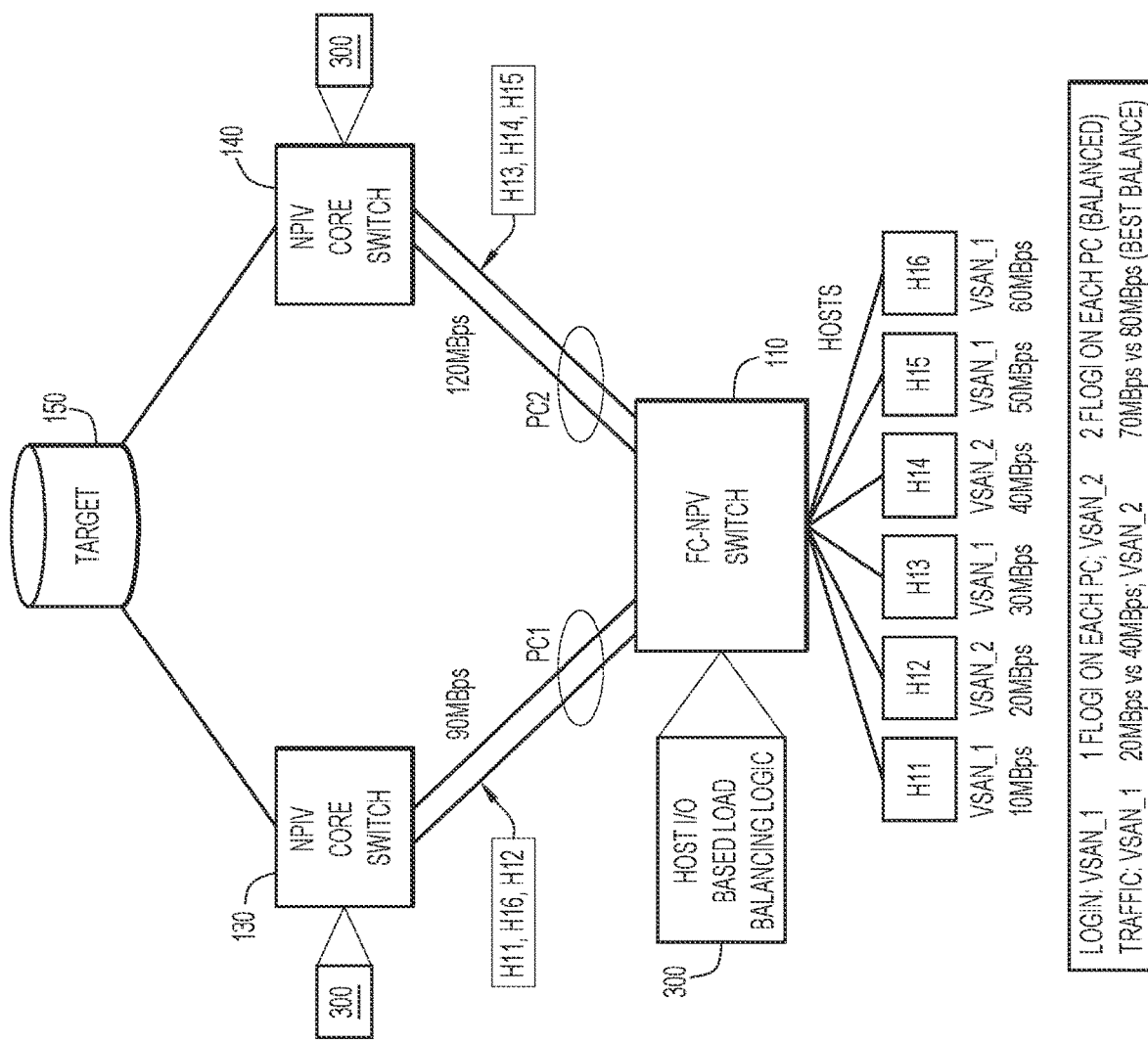
FIG. 3 shows another Fibre Channel network topology, including a switch having host I/O based load balancing logic, in which port channel traffic is balanced, in accordance with an example embodiment.

Logic 300 can also execute multi-VSAN load balancing, which includes analysis on a per-VSAN basis, as illustrated by the optimized load balancing shown in FIG. 3. As shown, there are a total of six hosts H11, H12, H13, H14, H15 and H16. In the figure, hosts H12 and H14 are part of VSAN_1, and hosts H11, H13, H15 and H16 are part of VSAN_2. By load balancing in accordance with the embodiments described herein, FLOGIs associated with hosts H11-H16 are evenly distributed on port channels PC1 and PC2, and traffic associated with VSAN_1 is distributed 20 MBps vs 40 MBps on PC1 and PC2, respectively, and traffic associated with VSAN_2 is distributed 70 MBps (10+60) vs 80 MBps (30+50), for a total of 90 MBps on port channel PC1 and 120 MBps on port channel PC2.

Logic 300 may take into account other port channel uplink configuration parameters when applying new traffic maps, including:

The operational speed of both the uplink member ports; even though the member links of a given port channel must generally be of same speeds, the two uplink PCs to different NPIV core switches can be of different speeds.

The link level buffer-to-buffer (B2B) credits (NP_port txB2B) on the uplink PC members; even though aggregate credits of each PC should ideally be the same, different model NPIV core switches can cause an imbalance. Ideally the credits of the PC uplink vs the credits of all the hosts mapped to that uplink should be ballpark in proportion to the bandwidth oversubscription.

Hence, before logic 300 generates the ideal traffic map any inherent imbalance present due to the above are computed and indicated as warnings in the ShowNPVTrafficMap output.

The application of a new traffic map with the npv traffic-map can be disruptive to certain host ports due to a re-login. It is assumed that hosts are generally multi-homed with multiple ports logged into 2 separate NPV switches. Consequently, a flap of one port may only lose one path for the host and can be considered non disruptive for the host as a whole.

In sum, by measuring the per-port, per-host, per-VSAN I/O traffic using SAN Analytics—an on-switch script integrated with PMON allows the admin to automate the application of fairly load balanced traffic map in a FC-NPV topology. This can significantly reduce application performance issues due to severe traffic imbalance on the FC-NPV switch uplinks.

Figure 4:
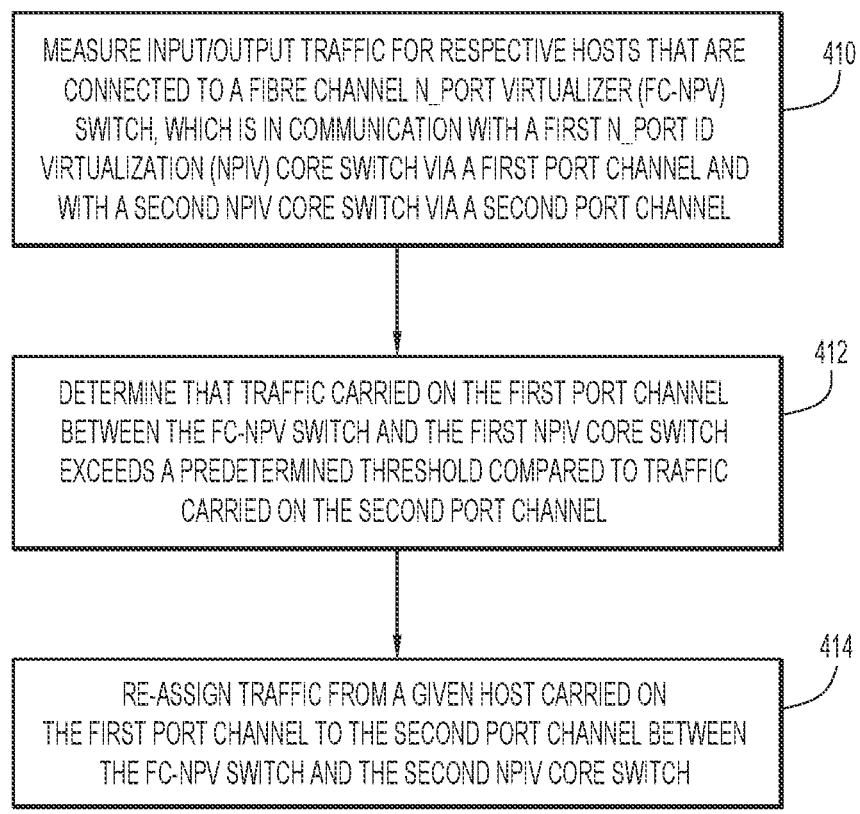
FIG. 4 is a flowchart depicting a series of operations for achieving load balancing in a Fibre Channel network topology, in accordance with an example embodiment.

FIG. 4 is a flowchart depicting a series of operations, or method, for achieving load balancing in a Fibre Channel network topology, in accordance with an example embodiment. At 410, the method includes measuring input/output traffic for respective hosts that are connected to a Fibre Channel N_Port Virtualizer (FC-NPV) switch, which is in communication with a first N_Port ID Virtualization (NPIV) core switch via a first port channel and with a second NPIV core switch via a second port channel. At 412, the method includes determining that traffic carried on the first port channel between the FC-NPV switch and the first NPIV Core switch exceeds a predetermined threshold compared to traffic carried on the second port channel. And, at 414, the method includes re-assigning traffic from a given host carried on the first port channel to the second port channel between the FC-NPV switch and the second NPIV core switch.

Figure 5:
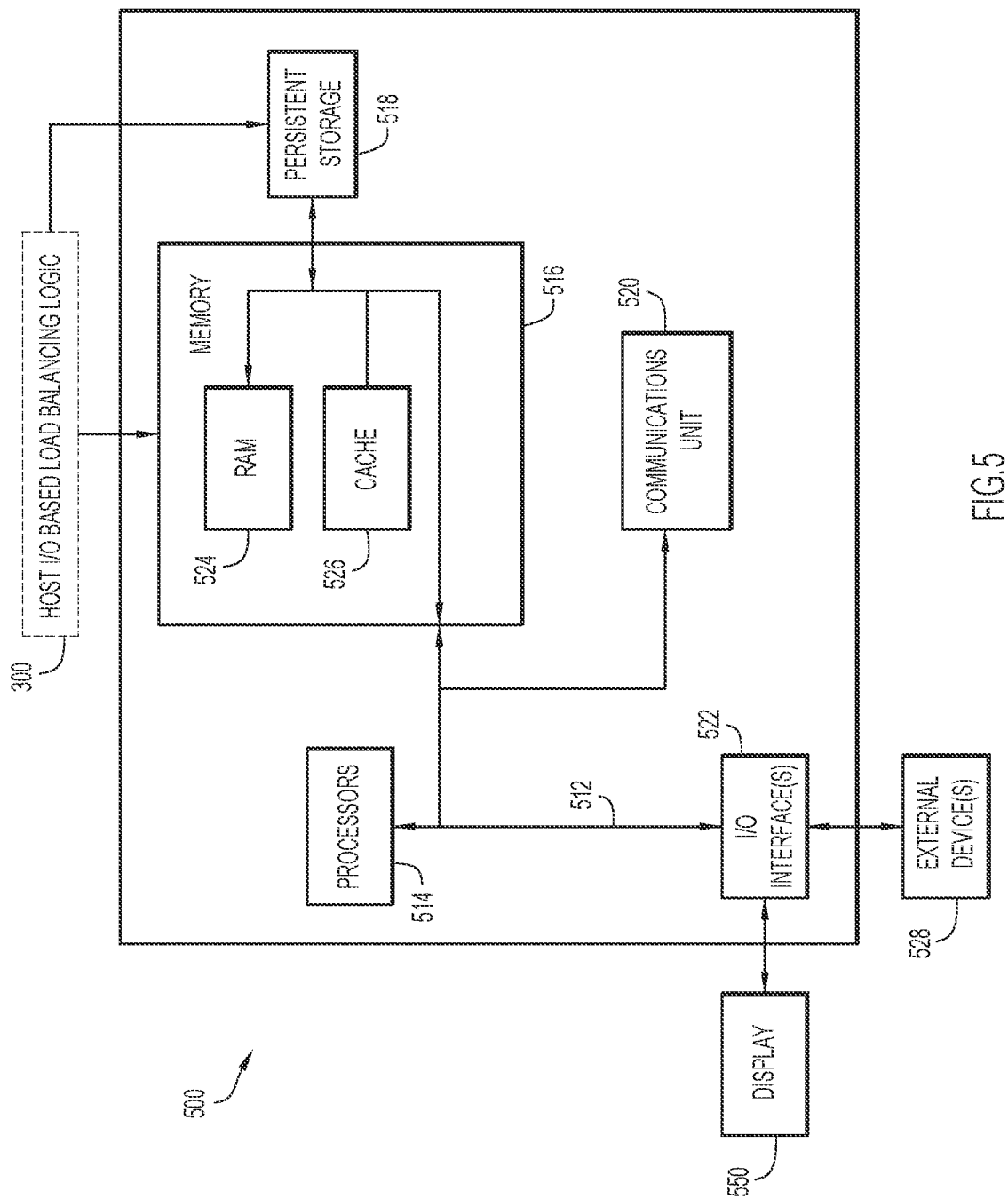
FIG. 5 depicts a device on which host I/O based load balancing logic may be deployed in accordance with an example embodiment.

FIG. 5 depicts a device (e.g., FC-NPV switch 110) on which host I/O based load balancing logic may be deployed in accordance with an example embodiment. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media.

One or more programs (e.g., host I/O based load balancing logic 300) may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 514, cause the computing device 500 to perform the operations described herein.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes measuring input/output traffic for respective hosts that are connected to a Fibre Channel N_Port Virtualizer (FC-NPV) switch, which is in communication with a first N_Port ID Virtualization (NPIV) core switch via a first port channel and with a second NPIV core switch via a second port channel; determining that traffic carried on the first port channel between the FC-NPV switch and the first NPIV Core switch exceeds a predetermined threshold compared to traffic carried on the second port channel; and re-assigning traffic from a given host carried on the first port channel to the second port channel between the FC-NPV switch and the second NPIV core switch.

In an embodiment, the input/output traffic (T) is defined by an equation T=m+s, wherein m is a sample mean input/output traffic throughput, and s is one sample standard deviation of the input/output traffic throughput.

In one implementation, the sample mean input/output traffic throughput may be calculated over a 24 hour period.

The method may further include evenly distributing fabric logins (FLOGIs) from the respective hosts over the first port channel and the second port channel.

The method may still further include performing the measuring on the FC-NPV switch, and/or performing the measuring on the first NPIV core switch and the second NPIV core switch.

The measuring may be performed on a per-virtual storage area network (VSAN) basis.

In one embodiment, the method includes monitoring down events for the first port channel and the second port channel, and when a down event is detected, stopping the measuring and restarting the measuring once the down event is cleared.

In another form, a device may also be provided in accordance with an embodiment. The device may include an interface unit configured to enable network communications; a memory; and one or more processors coupled to the interface unit and the memory, and configured to: measure input/output traffic for respective hosts, which are in communication with a first N_Port ID Virtualization (NPIV) core switch via a first port channel and with a second NPIV core switch via a second port channel; determine that traffic carried on the first port channel exceeds a predetermined threshold compared to traffic carried on the second port channel; and re-assign traffic from a given host carried on the first port channel to the second port channel.

In an embodiment, the input/output traffic (T) is defined by an equation T=m+s, wherein m is a sample mean input/output traffic throughput, and s is one sample standard deviation of the input/output traffic throughput.

The sample mean throughput may be calculated over a 24 hour period.

In an embodiment the one or more processors may be configured to evenly distribute fabric logins (FLOGIs) from the respective hosts over the first port channel and the second port channel.

In an embodiment, the apparatus includes a Fibre Channel N_Port Virtualization (FC-NPV) switch.

In an embodiment the one or more processors may be configured to measure input/output traffic for respective hosts on the first NPIV core switch and the second NPIV core switch, on a per-virtual storage area network (VSAN) basis.

In another embodiment the one or more processors may be configured to measure the input/output traffic based on a speed of the first port channel and the second port channel, and link level buffer-to-buffer (B2B) credits.

In still another embodiment, the one or more processors may be further configured to establish a port monitoring policy that is configured to maintain an upper and lower threshold for an imbalance between the first port channel and the second port channel.

In yet another embodiment, the one or more processors may be further configured to monitor down events for the first port channel and the second port channel, and when a down event is detected, to stop measuring and to restart measuring once the down event is cleared.

In still another form, a non-transitory computer readable storage media is provided that is encoded with instructions that, when executed by a processor, cause the processor to measure input/output traffic for respective hosts, which are in communication with a first N_Port ID Virtualization (NPIV) core switch via a first port channel and with a second NPIV core switch via a second port channel; determine that traffic carried on the first port channel exceeds a predetermined threshold compared to traffic carried on the second port channel; and re-assign traffic from a given host carried on the first port channel to the second port channel.

The instructions may further include instructions that, when executed by a processor, cause the processor to evenly distribute fabric logins (FLOGIs) from the respective hosts over the first port channel and the second port channel.

The above description is intended by way of example only. Various modifications and structural changes may be made therein without departing from the scope of the concepts described herein and within the scope and range of equivalents of the claims.

What is claimed is:
1. A method comprising:
measuring input/output traffic for respective hosts that are connected to a Fibre Channel N_Port Virtualizer (FC-NPV) switch, which is in communication with a first N_Port ID Virtualization (NPIV) core switch via a first port channel and with a second NPIV core switch via a second port channel, wherein the first NPIV core switch and the second NPIV core switch are in communication with a same target device;
determining that traffic carried on the first port channel between the FC-NPV switch and the first NPIV core switch exceeds traffic carried on the second port channel between the FC-NPV switch and the second NPIV core switch by a predetermined threshold; and
in response to determining that the predetermined threshold has been exceeded, re-assigning, via fibre channel login (FLOGI) operations, traffic from a given host carried on the first port channel to the second port channel between the FC-NPV switch and the second NPIV core switch,
wherein the re-assigning comprises taking into account link level buffer-to-buffer credits on the first port channel and the second port channel.

2. The method of claim 1, wherein the input/output traffic (T) is defined by an equation T=m+s, wherein m is a sample mean input/output traffic throughput, and s is one sample standard deviation of the input/output traffic throughput.

3. The method of claim 2, wherein the sample mean input/output traffic throughput is calculated over a 24 hour period.

4. The method of claim 1, further comprising evenly distributing fabric logins (FLOGIs) from the respective hosts over the first port channel and the second port channel.

5. The method of claim 1, further comprising performing the measuring on the FC-NPV switch.

6. The method of claim 1, further comprising performing the measuring on the first NPIV core switch and the second NPIV core switch.

7. The method of claim 1, wherein the measuring is performed on a per-virtual storage area network (VSAN) basis.

8. The method of claim 1, wherein the predetermined threshold is 40%.

9. The method of claim 1, further comprising monitoring down events for the first port channel and the second port channel, and when a down event is detected, stopping the measuring and restarting the measuring once the down event is cleared.

10. An apparatus comprising:
an interface unit configured to enable network communications;
a memory; and
one or more processors coupled to the interface unit and the memory, and configured to:
measure input/output traffic for respective hosts, which are in communication with a first N Port ID Virtualization (NPIV) core switch via a first port channel and with a second NPIV core switch via a second port channel, wherein the first NPIV core switch and the second NPIV core switch are in communication with a same target device;
determine that traffic carried on the first port channel exceeds traffic carried on the second port channel by a predetermined threshold; and
in response to determining that the predetermined threshold has been exceeded, re-assign, via fibre channel login (FLOGI) operations, traffic from a given host carried on the first port channel to the second port channel,
wherein the processor is configured to re-assign the traffic by taking into account link level buffer-to-buffer credits on the first port channel and the second port channel.

11. The apparatus of claim 10, wherein the input/output traffic (T) is defined by an equation T=m+s, wherein m is a sample mean input/output traffic throughput, and s is one sample standard deviation of the input/output traffic throughput.

12. The apparatus of claim 11, wherein the sample mean throughput is calculated over a 24 hour period.

13. The apparatus of claim 10, wherein the one or more processors are further configured to evenly distribute fabric logins (FLOGIs) from the respective hosts over the first port channel and the second port channel.

14. The apparatus of claim 10, wherein the apparatus comprises a Fibre Channel N Port Virtualization (FC-NPV) switch.

15. The apparatus of claim 10, wherein the one or more processors are further configured to measure input/output traffic for respective hosts on the first NPIV core switch and the second NPIV core switch, on a per-virtual storage area network (VSAN) basis.

16. The apparatus of claim 10, wherein the one or more processors are further configured to measure the input/output traffic based on a speed of the first port channel and the second port channel.

17. The apparatus of claim 10, wherein the one or more processors are further configured to establish a port monitoring policy that is configured to maintain an upper and lower threshold for an imbalance between the first port channel and the second port channel.

18. The apparatus of claim 10, wherein the one or more processors are further configured to monitor down events for the first port channel and the second port channel, and when a down event is detected, to stop measuring and to restart measuring once the down event is cleared.

19. A non-transitory computer readable storage media encoded with instructions that, when executed by a processor, cause the processor to:
measure input/output traffic for respective hosts, which are in communication with a first N Port ID Virtualization (NPIV) core switch via a first port channel and with a second NPIV core switch via a second port channel, wherein the first NPIV core switch and the second NPIV core switch are in communication with a same target device;
determine that traffic carried on the first port channel exceeds traffic carried on the second port channel by a predetermined threshold; and
in response to determining that the predetermined threshold has been exceeded, re-assign, via fibre channel login (FLOGI) operations and taking into account link level buffer-to-buffer credits on the first port channel and the second port channel, traffic from a given host carried on the first port channel to the second port channel.

20. The non-transitory computer readable storage media of claim 19, wherein the instructions, when executed by the processor, cause the processor to evenly distribute fabric logins (FLOGIs) from the respective hosts over the first port channel and the second port channel.

* * * * *

UNITED STATES PATENT AND TRADEMARK OFFICE
CERTIFICATE OF CORRECTION

PATENT NO. : 11,349,783 B2
APPLICATION NO. : 16/531324
DATED : May 31, 2022
INVENTOR(S) : Harsha Bharadwaj et al.

Page 1 of 1

It is certified that error appears in the above-identified patent and that said Letters Patent is hereby corrected as shown below:

In the Claims

Claim 10, Column 15, Line 11, please replace "communication with a first N Port ID" with -- communication with a first N_Port ID --

Claim 14, Column 15, Line 41, please replace "Fibre Channel N Port Virtualization" with -- Fibre Channel N_Port Virtualization --

Claim 19, Column 16, Line 22, please replace "communication with a first N Port ID" with -- communication with a first N_Port ID --

Signed and Sealed this
Twenty-third Day of August, 2022

Katherine Kelly Vidal
*Director of the United States Patent and Trademark Office*